United States Patent
Takagi et al.

(10) Patent No.: US 7,509,666 B2
(45) Date of Patent: Mar. 24, 2009

(54) DIGITAL TELEVISION BROADCAST SIGNAL RECEIVER

(75) Inventors: Toshihiro Takagi, Daito (JP); Yoshihisa Nagamura, Daito (JP); Yasuhiro Inui, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 816 days.

(21) Appl. No.: 11/165,247

(22) Filed: Jun. 24, 2005

(65) Prior Publication Data

US 2006/0010473 A1     Jan. 12, 2006

(30) Foreign Application Priority Data

Jun. 25, 2004     (JP)     ............... 2004-188956

(51) Int. Cl.
*H04H 1/00* (2006.01)
*H04B 1/18* (2006.01)
*H04N 5/44* (2006.01)

(52) U.S. Cl. .................. 725/72; 455/3.02; 455/179.1; 348/725

(58) Field of Classification Search .................. 725/72; 455/3.02, 179.1; 348/725
See application file for complete search history.

(56) References Cited

U.S. PATENT DOCUMENTS

| | | | | | |
|---|---|---|---|---|---|
| 5,351,060 | A | * | 9/1994 | Bayne | 343/766 |
| 5,579,367 | A | * | 11/1996 | Raymond et al. | 455/418 |
| 5,584,051 | A | * | 12/1996 | Goken | 455/68 |
| 5,943,372 | A | * | 8/1999 | Gans et al. | 375/347 |
| 5,970,386 | A | * | 10/1999 | Williams | 725/69 |
| 6,029,044 | A | * | 2/2000 | Arsenault et al. | 725/68 |
| 6,216,266 | B1 | * | 4/2001 | Eastman et al. | 725/72 |
| 6,334,218 | B1 | * | 12/2001 | Jeong et al. | 725/72 |
| 6,433,905 | B1 | * | 8/2002 | Price et al. | 398/139 |
| 6,580,452 | B1 | * | 6/2003 | Gangitano | 348/180 |
| 7,120,431 | B1 | * | 10/2006 | Huo et al. | 455/423 |
| 2003/0179138 | A1 | * | 9/2003 | Chen | 342/372 |
| 2004/0248517 | A1 | * | 12/2004 | Reichgott et al. | 455/63.4 |
| 2005/0108759 | A1 | * | 5/2005 | Arsenault et al. | 725/72 |
| 2006/0111047 | A1 | * | 5/2006 | Louberg et al. | 455/41.2 |

FOREIGN PATENT DOCUMENTS

| | | |
|---|---|---|
| JP | 2000-138928 | 6/2000 |
| JP | 2002-122651 | 4/2002 |

* cited by examiner

*Primary Examiner*—Brian T Pendleton
*Assistant Examiner*—Jonathan Lewis
(74) *Attorney, Agent, or Firm*—Crowell & Moring LLP

(57) ABSTRACT

A TV broadcast receiver measures, at least two times, a signal intensity in a maximum receiving direction and a signal intensity in the 180 degree opposite receiving direction among 16 receiving directions of a smart antenna. If the signal intensity in the maximum receiving direction is significantly different from that in the opposite receiving direction, it determines that the smart antenna is connected. If the signal intensity in the maximum receiving direction is substantially the same as that in the opposite receiving direction, it determines that the smart antenna is disconnected. It displays messages of the connection and disconnection of the smart antenna on a monitor.

This makes it possible to quickly determine whether the antenna connected to the TV broadcast receiver is a smart antenna or a stationary unidirectional antenna.

5 Claims, 6 Drawing Sheets

Smart Antenna Setting Screen

DIGITAL TELEVISION BROADCAST SIGNAL RECEIVER

BACKGROUND OF THE INVENTION

1. Field of the Invention

The present invention relates to a television broadcast signal receiver for receiving digital television broadcast signals such as ATSC (Advanced Television Systems Committee).

2. Description of the Related Art

In the North American Continent such as the United States of America where ATSC digital television (hereafter referred to simply as "TV broadcast") is broadcast, big cities spread across the plains. From the viewpoint of a television user or viewer to receive TV broadcast signals, which are broadcast in big cities or their suburbs, the TV broadcast signals or even one TV broadcast signal may come from various directions. Thus, it is necessary for the television user to adjust the direction of an antenna in the direction of a broadcast tower transmitting a television broadcast signal of a television program which the user wishes to watch.

For this reason, multi-directional antennas such as a so-called smart antenna are put to practical use. On the other hand, general antennas for receiving terrestrial broadcast signals have a shape of the so-called Yagi antenna, which has a high directivity to be able to receive a weak radio wave or signal. At the same time, the Yagi antenna has a drawback that it can receive only a radio wave from one broadcast tower due to the high directivity, hence the Yagi-antenna being a unidirectional antenna. Thus, currently, the multi-directional smart antennas and the unidirectional Yagi-antennas coexist.

Meanwhile, several methods are known for discriminating or determining the kind of an antenna to determine a receiving direction of the antenna. For example, Japanese Laid-open Patent Publication 2000-138928 discloses a method for discriminating between a community antenna type and a direct connection type such as a CS (Communication Satellite) antenna, using data of the respective broadcast frequencies. Further, Japanese Laid-open Patent Publication 2002-122651 discloses a method for discriminating between an active antenna and a passive antenna according to the presence or absence of an amplifier.

As described above, according to the ATSC digital television broadcast in the United States of America, the broadcast signals or waves may come from various directions, so that multi-directional antennas such as a smart antenna are needed to receive such TV broadcasts. The EIA (Electronic Industries Association)-909 standard provides a smart antenna having sixteen equiangular receiving directions in 360 degrees. A digital TV (television) broadcast signal receiver conforming to the ETA-909, standard is set to be able to adjust or switch an active signal receiving direction of the multi-directional antenna such as the smart antenna to every one of the sixteen receiving directions.

Some of such digital TV broadcast signal receivers have an omni-directional scan function (automatic scan function) to select the receiving direction of an antenna in which a digital TV broadcast signal of a channel selected by a TV user can be best received. This can be done by scanning the sixteen directions for each channel, and by setting the best receiving direction as a receiving direction for the channel, because usually the position of a broadcast antenna or a broadcast tower of a broadcast station does not change. However, in countries like the United States of America, broadcast stations may go into bankruptcy while it is relatively easy to open new broadcast stations. Accordingly, channels which could not previously be received may become receivable, while channels which could previously be received may become unreceivable. Furthermore, the receiving conditions of digital TV broadcast signals may change due to newly built high rise buildings. For this reason, it may be necessary to reset the best receiving direction for the channel selected by the TV user. In such case, a multi-directional antenna which can switch the receiving direction in a short time can be connected to a digital TV broadcast signal receiver having the omni-directional scan function.

When a user attempts to reset the best receiving direction, it may occur that the antenna then connected to the digital TV broadcast signal receiver is a general stationary unidirectional antenna, not a multi-directional antenna. If the user operates the digital TV broadcast signal receiver to attempt an omni-directional scan operation of the antenna without being aware that a multi-directional antenna is not connected to or disconnected from the receiver, the receiver cannot receive a TV program of a channel which the user desires to view unless the stationary unidirectional antenna happens to be pointed in the receiving direction for receiving the channel. At the same time, the digital TV broadcast signal receiver attempts, in vain, to omni-directionally scan all the sixteen directions, thereby causing a waste of time and energy for determining the best receiving direction. In a digital TV broadcast signal receiver, it is primarily important whether or not a multi-directional antenna is connected to the receiver.

SUMMARY OF THE INVENTION

An object of the present invention is to provide a digital TV broadcast signal receiver that can quickly and securely determine, and preferably notify a user by displaying on a display whether or not it is connected to a multi-directional antenna, thereby making it possible to determine a best receiving direction of the multi-directional antenna quickly and without fail after confirming the connection of the antenna, and to reduce time and number of scans required for selecting a desired channel to receive.

According to a first aspect of the present invention, the above object is achieved by a digital television broadcast signal receiver to which a multi-directional antenna is to be connected for receiving a television broadcast signal by making one of the multiple receiving directions active, the digital television broadcast signal receiver comprising: a control signal output unit for outputting, to the multi-directional antenna, a control signal to command a receiving direction for receiving the television broadcast signal; a tuner which is to be connected to the multi-directional antenna for receiving the television broadcast signal and measuring signal intensity of the received television broadcast signal; a broadcast signal processing unit for subjecting the television broadcast signal received by the tuner to a predetermined signal processing; an image signal output unit for outputting, to a monitor, the television broadcast signal having been subjected to the predetermined signal processing by the broadcast signal processing unit; a memory for temporarily storing the television broadcast signal having been subjected to the predetermined signal processing by the broadcast signal processing unit; a receiving direction determining unit for determining a best receiving direction for each receivable channel using the television broadcast signal stored in the memory; a main controller for controlling respective elements in the digital television broadcast signal receiver; and an antenna connection selecting switch for selecting connection of antenna and for starting an operation of the control signal output unit.

When the antenna connection selecting switch is set in an automatic mode, the control signal output unit sequentially outputs, to the multi-directional antenna at given time intervals, a control signal to sequentially command receiving directions of the multi-directional antenna. The tuner sequentially measures signal intensities of the television broadcast signal in the multiple receiving directions for at least one channel, the measured signal intensities being stored in the memory. Based on the measured and stored signal intensities, the main controller detects a maximum receiving direction to give a maximum signal intensity among the receiving directions of the multi-directional antenna. The tuner further measures signal intensity of the television broadcast signal in an opposite receiving direction 180 degrees opposite to the maximum receiving direction to give the maximum signal intensity, the measured signal intensity in the opposite receiving direction being stored in the memory. If the signal intensity in the maximum receiving direction is significantly different from the signal intensity in the opposite receiving direction for the at least one channel, the main controller determines that the multi-directional antenna is connected to the tuner. On the other hand, if the signal intensity in the maximum receiving direction is substantially the same as the signal intensity in the opposite receiving direction for the at least one channel, the main controller determines that the multi-directional antenna is disconnected from the tuner.

This makes it possible to detect the multi-directional antenna or determine whether to not the multi-directional antenna is connected to the tuner by comparing the signal intensity of the television broadcast signal in the maximum receiving direction with that in the opposite receiving direction 180 degrees opposite to the maximum receiving direction, based on the mechanism or principle that an antenna gain of a multi-directional antenna such as a smart antenna in one receiving direction is significantly different from that in the opposite direction. In particular, in the case where the antenna connected to the tuner is a common stationary uni-directional antenna, not the multi-directional antenna, the user can quickly recognize that the multi-directional antenna is disconnected from the tuner, and thus can quickly start channel selection on the basis of the stationary unidirectional antenna. This makes it possible for the user to omit unnecessary operation such as operating the digital television broadcast signal receiver to scan the multiple receiving directions of the multi-directional antenna, thereby preventing unnecessary time and energy of determining a best receiving direction.

According to a second aspect of the present invention, the above object is achieved by a digital television broadcast signal receiver to which a multi-directional antenna is to be connected for receiving a television broadcast signal by making one of the multiple receiving directions active, the digital television broadcast signal receiver comprising: a control signal output unit for outputting, to the multi-directional antenna, a control signal to command a receiving direction for receiving the television broadcast signal; a tuner which is to be connected to the multi-directional antenna for receiving the television broadcast signal and measuring signal intensity of the received television broadcast signal; a broadcast signal processing unit for subjecting the television broadcast signal received by the tuner to a predetermined signal processing; an image signal output unit for outputting, to a monitor, the television broadcast signal having been subjected to the predetermined signal processing by the broadcast signal processing unit; a memory for temporarily storing the television broadcast signal having been subjected to the predetermined signal processing by the broadcast signal processing unit; a main controller for controlling respective elements in the digital television broadcast signal receiver; and an antenna connection selecting switch for selecting connection of antenna and for starting an operation of the control signal output unit.

When the antenna connection selecting switch is set in an automatic mode, the control signal output unit outputs, to the multi-directional antenna, a control signal to command a receiving direction of the multi-directional antenna. In at least one receiving direction for at least one channel, the tuner measures at least one signal intensity of the television broadcast signal to give a predetermined level or higher to enable image display of a predetermined quality or higher, the measured at least one signal intensity being stored in the memory. The tuner further measures at least one further signal intensity of the television broadcast signal which is a signal intensity in an opposite receiving direction 180 degrees opposite to the at least one receiving direction to give the predetermined level or higher, the measured at least one further signal intensity being stored in the memory. If the at least one signal intensity in the at least one receiving direction is significantly different from the at least one further signal intensity in the opposite receiving direction, the main controller determines that the multi-directional antenna is connected to the tuner, and displays a message of the connection on the monitor. On the other hand, if the at least one signal intensity in the at least one receiving direction is substantially the same as the at least one further signal intensity in the opposite receiving direction, the main controller determines that the multi-directional antenna is disconnected from the tuner, and displays a message of the disconnection on the monitor.

This makes it possible to more quickly and securely determine the connection or disconnection of the multi-directional antenna, and to notify the user of the connection or disconnection on the monitor. More specifically, it gives a high probability of being able to determine the connection or disconnection of the multi-directional antenna before completion of one omni-directional scan for the multiple receiving directions.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 7A is a schematic view showing an example of a display screen, while

DESCRIPTION OF THE PREFERRED EMBODIMENTS

The best modes and preferred embodiments of the present invention will be described hereinafter with reference to the annexed drawings. Note that the specific embodiments described are not intended to cover the entire scope of the present invention, and hence the present invention is not limited to only the specific embodiments.

Figure 1:
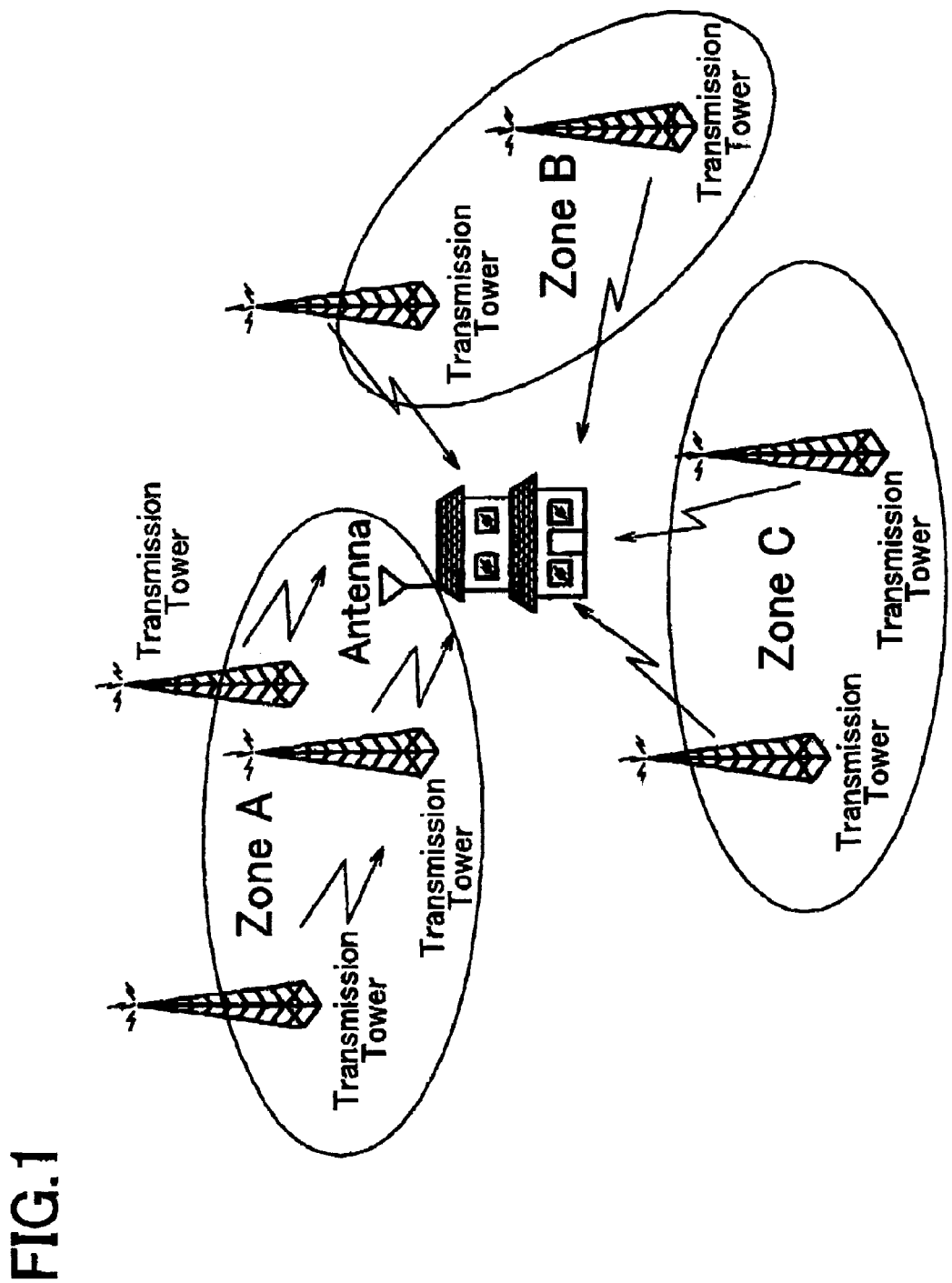
FIG. 1 is a conceptual view showing a situation in which a digital TV (television) broadcast signal receiver according to embodiments of the present invention installed in a general home receives TV broadcast signals.

A digital TV (Television) broadcast signal receiver according to an embodiment of the present invention will be described. FIG. 1 is a schematic view showing a situation in which, using a digital TV broadcast signal receiver such as a digital TV broadcast signal receiver 1 shown in later described FIG. 2, a user at home receives digital TV broadcast signals from broadcast towers located in various zones. Generally, if a digital TV broadcast signal receiver receives digital TV broadcast signals of digital (terrestrial) TV broadcast which have a signal intensity equal to or higher than a predetermined threshold value, it is possible to obtain images of a certain quality or higher, using error correction and the like. Here, it is assumed that the digital TV broadcast signal receiver in the home of the user can receive digital TV broadcast signals transmitted from broadcast towers spreading across multiple locations e.g. in zone A, zone B and zone C, and that it is possible to view TV programs transmitted from the broadcast towers. A multi-directional antenna, called a smart antenna, having multiple receiving directions is put to practical use for such situation.

Generally, a digital TV broadcast signal receiver can receive analog TV broadcast signals as well. A digital TV broadcast signal receiver which can efficiently control a best receiving direction of a multi-directional antenna for digital TV broadcast signals, confirming the number of the receiving directions of the multi-directional antenna, can similarly perform a best receiving direction control for analog TV broadcast signals. Thus, in the present specification, both the digital TV broadcast signal and the analog TV broadcast signal are referred to as TV broadcast signal when it is not necessary to distinguish between the two.

It is to be noted that a digital TV broadcast signal receiver to conform to the EIA-909 standard is required to be able to switch an active signal receiving direction of the multi-directional antenna such as the smart antenna to every one of the sixteen receiving directions. When connected to the multi-directional antenna, the digital TV broadcast signal receiver according to the present embodiment receives, and measures receiving conditions of, digital TV broadcast signals coming from sixteen receiving directions provided in the EIA-909 standard, respectively. The digital TV broadcast signal receiver further stores, in a memory, a best or maximum direction for each channel in which the received signal intensity is maximum for the channel, and immediately orients or points the multi-directional antenna in the best direction for channel selection.

Figure 2:
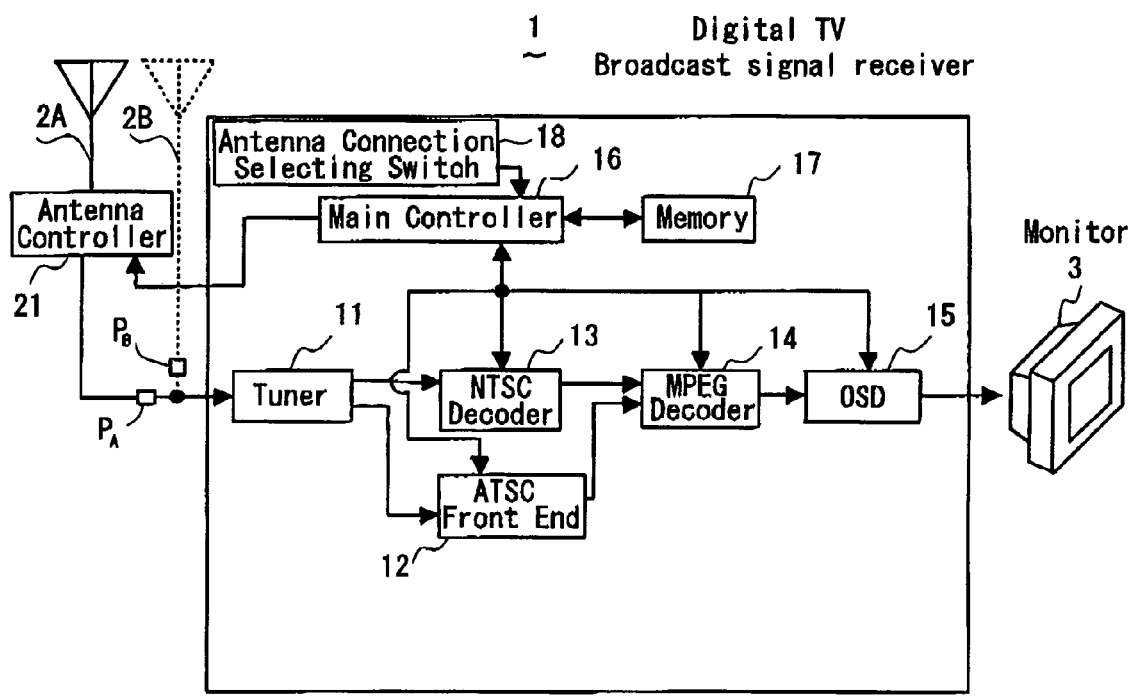
FIG. 2 is a schematic block diagram of the digital TV broadcast signal receiver according to the embodiments of the present invention.

FIG. 2 shows a digital TV broadcast signal receiver 1 according to the embodiment here, as well as a later described further embodiment, of the present invention. Referring to FIG. 2, the digital TV broadcast signal receiver 1 comprises a tuner (broadcast signal receiving unit) 11 connected to a multi-directional antenna 2A via a plug $P_A$ or a stationary unidirectional antenna 2B (shown by dotted line) via a plug $P_B$ for receiving a TV broadcast signal. When the antenna controller 21 of the multi-directional antenna 2A is plugged in the plug $P_A$ by e.g. a user, the antenna controller 21 is connected via the plug $P_A$ to the tuner 11, while when the stationary unidirectional antenna 2B is plugged in the plug $P_B$ by e.g. the user, the stationary unidirectional antenna 2B is connected via the pug $P_B$ to the tuner 11. The present embodiment is based on an assumption that either the multi-directional antenna 2A or the stationary unidirectional antenna 2B is connected to the tuner 11 by e.g. the user via the plug 2A or the plug 2B.

The digital TV broadcast signal receiver 1 further comprises: an ATSC front end (digital signal processing unit) 12 for subjecting a digital TV broadcast signal received by the tuner 11 to predetermined signal processing, and decoding the digital TV broadcast signal; an NTSC (National Television System Committee) decoder (analog signal processing unit) 13 for decoding an analog TV broadcast signal received by the tuner 11; an MPEG (Motion Picture Experts Group) decoder 14 for decoding the TV broadcast signal which is an MPEG-compressed signal; an on-screen display (hereafter referred to simply as "OSD") signal superimposer (image signal output unit) 15 for superimposing a signal of a predetermined display image on the decoded TV broadcast signal to produce a combined image signal and for outputting the combined image signal to a monitor 3; a main controller 16 for detecting receiving conditions of TV broadcast signals received by the tuner 11 so as to control a control unit 21 of the multi-directional antenna 2A, and for controlling the entire TV broadcast signal receiver 1, namely for controlling respective elements in the digital TV broadcast signal receiver 1 including the ATSC front end 12 and the NTSC decoder 13; a memory (storage unit) 17 for temporarily storing the decoded TV broadcast signal and storing the display image to be superimposed on the decoded TV broadcast signal; and so on.

In the present specification, the combination of the ATSC front end 12, the NTSC decoder 13 and the MPEG decoder 13 constitutes a broadcast signal processing unit for subjecting the television broadcast signal received by the tuner to a predetermined signal processing. Further, the main controller 16 serves as a receiving direction determining unit (for determining a best receiving direction for each receivable channel), a control signal output unit (for outputting, to the multi-directional antenna, a control signal to command a receiving direction for receiving the television broadcast signal), and an entire control unit (for controlling respective elements in the digital TV broadcast signal receiver 1). Note that although the digital TV broadcast signal receiver 1 at the user site can send data to broadcast stations in digital TV broadcasting, description thereof is omitted herein because it does not directly relate to the present invention.

The digital TV broadcast signal receiver 1 further comprises an antenna connection selecting switch (antenna connection selecting unit) 18, which is connected to the main controller 16. When the antenna connection selecting switch 18 is turned on, the antenna controller 21 of the multi-directional antenna 2A starts its operation in response to a control signal from the main controller 16, and makes active one of multiple receiving directions of the multi-directional antenna 2A which one is commanded by the control signal, after the multi-directional antenna 2 is detected by a later described antenna detection process to detect whether the multi-directional antenna 2A is connected to the digital TV broadcast signal receiver 1. If the multi-directional antenna 2A is the type that changes the receiving direction by rotating the antenna using a motor, the antenna controller 21 controls the rotation of the motor so as to orient the antenna in the commanded direction. On the other hand, if the multi-directional antenna 2A is the type that selects an active antenna direction by turning on and off electronic switches, the antenna controller 21 turns on one of the electronic switches corresponding to the commanded direction, and turns off the other electronic switches.

Figure 3:
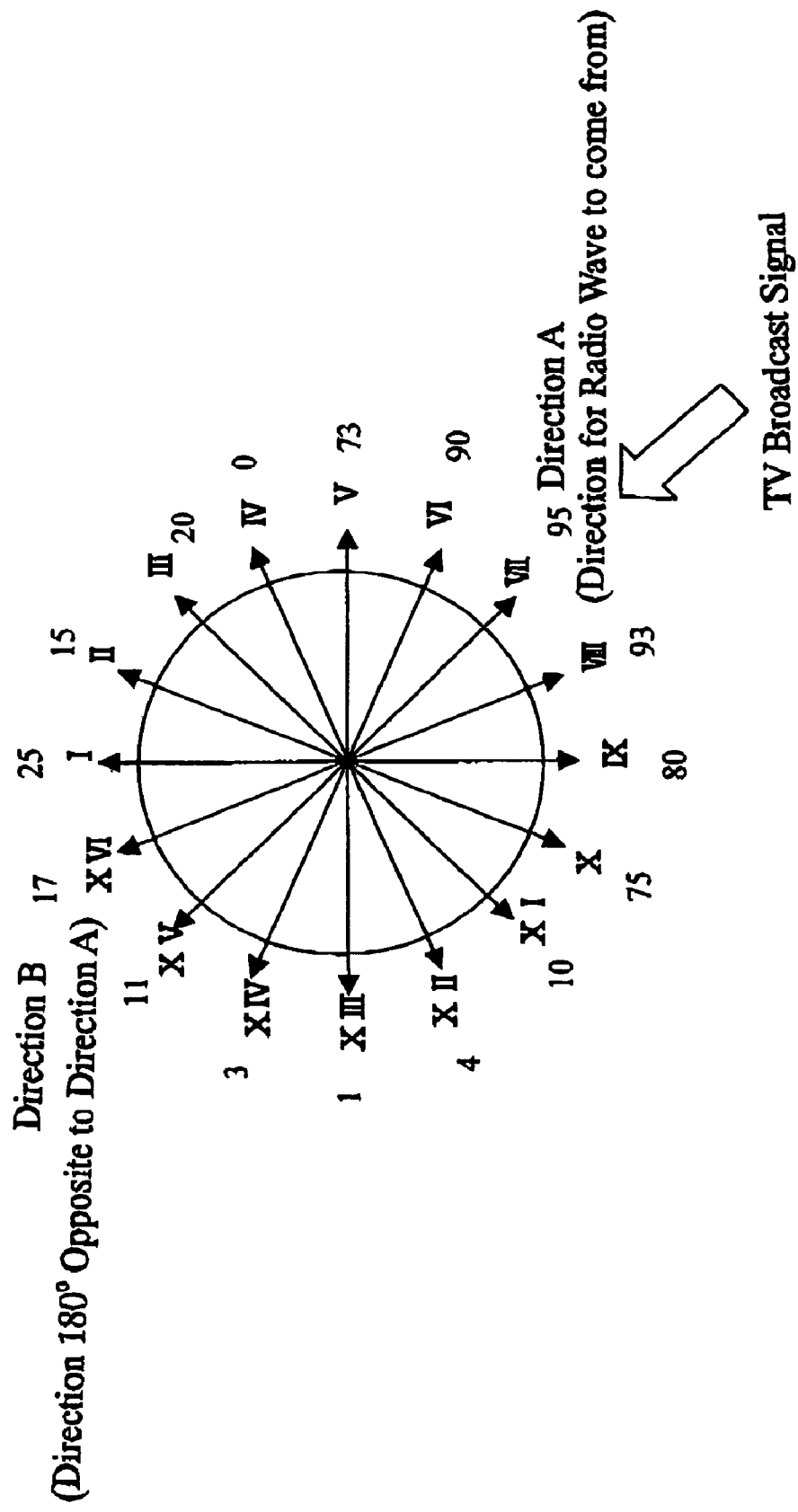
FIG. 3 is a chart showing an example of receiving condition of receiving a TV broadcast signal.

FIG. 3 is a chart showing an example of receiving condition of receiving a TV broadcast signal in the case where the multi-directional antenna 2A has sixteen receiving directions as provided in the EIA-909 standard. In FIG. 3, sixteen reference numerals I to XVI designate numbers of the respective sixteen receiving directions provided in the EIA-909 standard, while sixteen figures 25, 15, 20, 0 and so on ending with 17 designate sixteen signal intensities of a received TV broadcast signal of a certain channel. When a direction A to give a maximum signal intensity of the TV broadcast signal (direction A thus being referred to as a maximum receiving direction) is the direction number VII as shown in FIG. 3, a direction B which is 180 degrees opposite to the receiving direction A (direction number VII) is the direction number XV as also shown in FIG. 3. This indicates that among the sixteen directions, the direction number XV (generally designated by "m" hereafter) of the receiving direction B which is 180 degrees opposite to the receiving direction A (direction number VII which is generally designated by "n" hereafter) can be obtained by adding ±8 to n, where +8 is applied if $8 \geq n \geq 1$, while −8 is applied if $16 \geq n \geq 9$.

Figure 4:
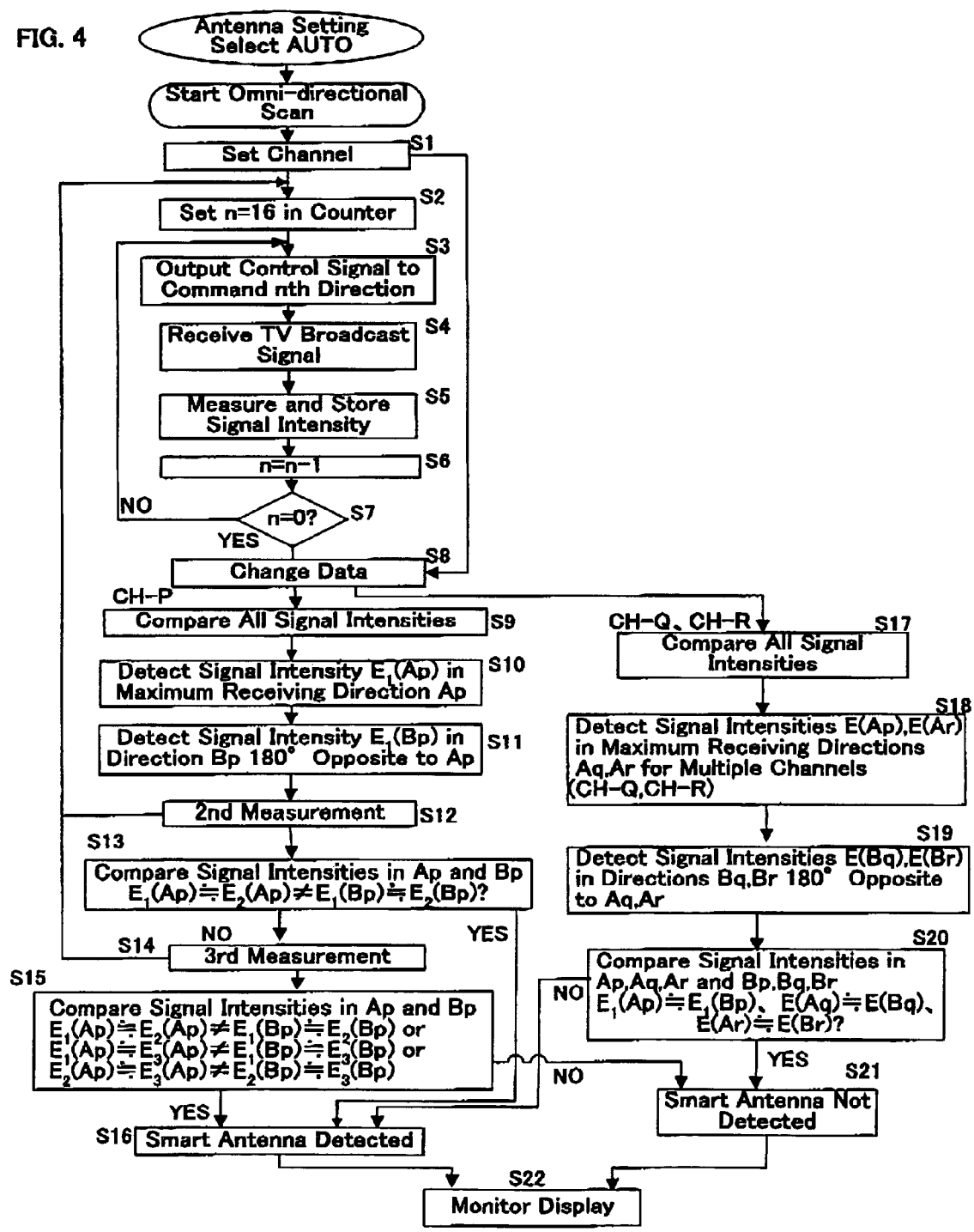
FIG. 4 is a flow chart showing a process performed by the digital TV broadcast signal receiver according to a first embodiment of the present invention.
Figure 6:
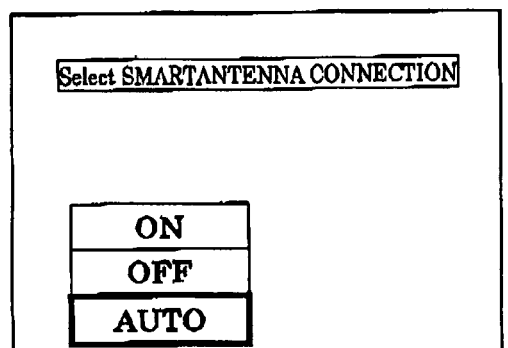
FIG. 6 is a schematic view showing an antenna connection setting screen.

Hereinafter, referring to the flow chart of FIG. 4 and the view of FIG. 6, a process performed by the digital TV broadcast signal receiver 1 according to a first embodiment of the present invention will be described, which more specifically includes a receiving direction control of the multi-directional antenna 2A and a detection control of detecting whether the multi-directional antenna 2A is connected to the digital TV broadcast signal receiver 1. FIG. 6 shows an antenna connection setting screen having an on switch ("ON"), an off switch ("OFF") and an automatic switch ("AUTO"). The on switch is selected by a user if the user is already aware that the multi-directional antenna 2A is connected to the tuner 11, while the off switch is selected by the user if the user is already aware that the multi-directional antenna 2A is disconnected from or not connected to the tuner 11, namely that the stationary unidirectional antenna 2B is connected to the tuner 11. On the other hand, the automatic switch is selected by the user if the user is not aware which antenna is connected to the tuner 11.

When an automatic switch (AUTO) for setting antenna connection is selected on an antenna connection setting screen so as to set the antenna connection selecting switch 18 in an automatic mode, the main controller 16 starts an omni-directional scan process on the assumption that the tuner 11 is connected to the multi-directional antenna 2A. When a certain channel (designated by channel P here) is set (S1), the main controller 16 sets n=16 in a counter (S2), and outputs a control signal to command an nth receiving direction (S3). After a certain time required for the main controller 16 to output the control signal to the antenna controller 21 of the multi-directional antenna 2A and to switch the receiving direction of the multi-directional antenna 2A, the tuner 11 receives a TV broadcast signal of channel P (S4). The tuner 11 measures the signal intensity of the TV broadcast signal, and the main controller 16 stores data of the measured signal intensity in the memory 17 (S5).

The main controller 16 sequentially outputs, to the multi-directional antenna 2A at given time intervals, the control signal to sequentially command receiving directions of the multi-directional antenna 2A as follows. The main controller 16 decrements the counter by one (S6), and determines whether the signal intensities of the TV broadcast signal in all the sixteen receiving directions have been measured by the tuner 11 (S7). If the signal intensities of the TV broadcast signal in all the sixteen receiving directions have not been measured by the tuner 11, the main controller 16 goes back to the step S3, and commands the tuner 11 to measure the signal intensity or intensities of the TV broadcast signal not having been measured (more specifically measure the signal intensity of the TV broadcast signal in each subsequent receiving direction until completion).

If the TV broadcast signal receiver 1 completes the measurements of the signal intensities of the TV broadcast signal for all the receiving directions (YES in S7), so that the TV broadcast signal receiver 1 stores all the measured data of signal intensities in the memory 17, the main controller 16 reads the measured data stored in the memory 17. The main controller 16 then compares all the signal intensities (S9), and thereby detects a maximum receiving direction $A_p$ to give maximum signal intensity $E_1(A_p)$ for channel P (hereafter referred to as CH-P) as well as an opposite receiving direction $B_p$ being 180 degrees opposite to the receiving direction $A_p$ and giving a signal intensity $E_1(B_p)$ (S10 and S11), and further stores these data $A_p$, $E_1(A_p)$, $B_p$ and $E_1(B_p)$ in the memory 17.

If the data of the signal intensities obtained by the one time (once) measurement satisfy the relation $E_1(A_p) \approx E_1(B_p)$ (YES in S20), meaning that they are substantially the same as each other, the main controller 16 determines that the multi-directional antenna (smart antenna) 2A is not connected to or disconnected from the tuner 11 (S16), namely that the stationary unidirectional antenna 2B is connected to the tuner 11. On the other hand, if they do not satisfy the relation $E_1(A_p) \approx E_1(B_p)$ (NO in S20), meaning that they are significantly different from each other, the main controller 16 determines that the multi-directional antenna (smart antenna) 2A is connected to the tuner 11 (S16).

The mechanism for determining the connection of the multi-directional antenna (smart antenna) 2A or the stationary unidirectional antenna 2B to the tuner 11 on the basis of whether or not the relation $E_1(A_p) \approx E_1(B_p)$ is satisfied is described as follows. The multi-directional antenna 2A having multiple receiving directions, such as sixteen receiving directions, always has an opposite receiving direction 180 degrees opposite to any one of the multiple receiving directions. Accordingly, the signal intensity in one receiving direction can have a value or level which is significantly different from the signal intensity in the opposite receiving direction 180 degrees opposite to the one receiving direction.

In contrast, the stationary unidirectional antenna 2B has only one receiving direction. Thus, even when the main controller 16 outputs a control signal to command any receiving direction, the stationary unidirectional antenna does not respond to the control signal. Accordingly, the signal intensity measured by the tuner 11, when connected to the stationary unidirectional antenna 2B, does not change even when the main controller 16 outputs a control signal, so that the signal intensity measured by the tuner 11 with the control signal from the main controller 16 to command one receiving direction is basically the same as the signal intensity measured by the tuner 11 with the control signal from the main controller 16 to command the opposite receiving direction which is 180 degrees opposite to the one receiving direction.

For more securely and reliably determining whether or not the multi-directional antenna 2A is connected to the tuner 11, multiple time measurements are made as follows. For such purpose, similar measurements of signal intensities in receiving direction $A_p$ and receiving direction $B_p$ are alternately made at least two times. The respective data obtained by the measurements are designated by $E_1(A_p)$ and $E_1(B_p)$ for the first measurement as described above, $E_2(A_p)$ and $E_2(B_p)$ for the second measurement, $E_3(A_p)$ and $E_3(B_p)$ for a possible third measurement, and $E_n(A_p)$ and $E_n(B_p)$ for a further possible nth measurement. If the data of the signal intensities obtained by the two time measurements (S12) satisfy the relation $E_1(A_p) \approx E_2(A_p) \neq E_1(B_p) \approx E_2(B_p)$ (YES in S13) which is referred to as relation (1), meaning that the former two and the latter two are substantially the same as each other while the former two are significantly different from the latter two, then the main controller 16 determines that the multi-directional antenna (smart antenna) 2A is connected to the tuner 11 (S16).

Figure 7A:
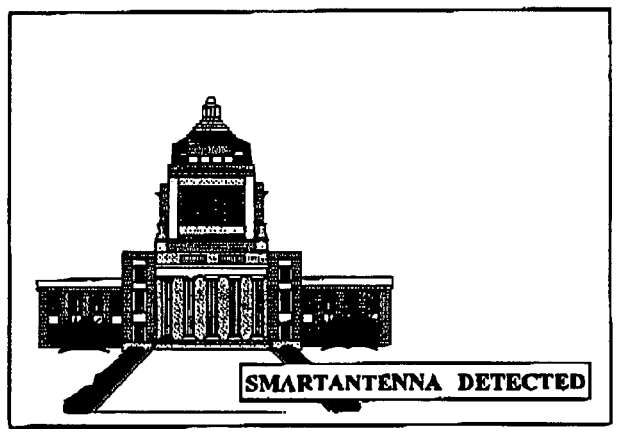

On the other hand, if the data of the signal intensities obtained by the two time measurements do not satisfy relation (1) above, then the third measurement is made (S14). If the data of the signal intensities obtained by the three time measurements satisfy at least two of the following three relations (S15): $E_1(A_p) \approx E_2(A_p) \neq E_1(B_p) \approx E_2(B_p)$ which is referred to as relation (1) as described above, $E_1(A_p) \approx E_3(A_p) \neq E_1(B_p) \approx E_3(B_p)$ which is referred to as relation (2), and $E_2(A_p) \approx E_3(A_p) \neq E_2(B_p) \approx E_3(B_p)$ which is referred to as relation (3) (YES in S15), then the main controller 16 determines that the multi-directional antenna (smart antenna) 2A is connected to the tuner 11 (S16). A message of this connection is displayed on the monitor 3 (S22) by displaying "SMART ANTENNA DETECTED" as shown in FIG. 7A.

Figure 7B:
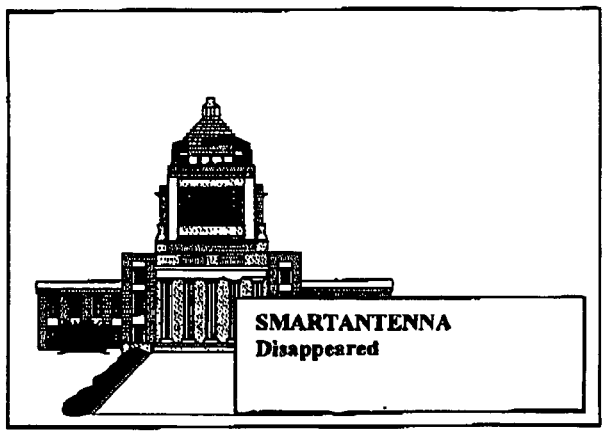
FIG. 7B is a schematic view showing another example of the display screen.

On the other hand, if the data of the signal intensities obtained by the three time measurements do not satisfy at least two of the above three relations (NO in S15), the main controller 16 determines that the multi-directional antenna (smart antenna) 2A is disconnected from the tuner 11 (S21), namely that the stationary unidirectional antenna 2B is connected to the tuner 11. A message of this disconnection is displayed on the monitor 3 (S22) by displaying "SMART ANTENNA DISAPPEARED" as shown in FIG. 7B.

It should be noted here that when the multi-directional antenna 2A is installed in a room as an indoor antenna for receiving digital terrestrial broadcasts, radio wave interference may occur such that a received radio wave is temporarily obstructed by a moving human body or other moving objects in the room. In such case, it may happen that a maximum value and a minimum value of signal intensity of the received TV broadcast signal do not clearly appear after one omni-directional scan (i.e. one time scanning search) using the multi-directional antenna 2A, so that the multi-directional antenna 2A, even if connected to the tuner 11, may not be recognized as being connected thereto.

Further, although a multi-directional antenna in general is multi-directional in principle with each directivity direction being rotated to be multi-directional, the multi-directional antenna, like a Yagi antenna, can be said to be unidirectional for one direction. Thus, the multi-directional antenna has a minimum antenna gain, and hence lowest signal intensity, in the direction which is 180 degrees opposite to the maximum receiving direction to give a maximum signal intensity of the received TV broadcast signal. Accordingly, whether the multi-directional antenna (smart antenna) 2A is connected to the tuner 11 can be more securely determined by measuring the signal intensities multiple times in one maximum receiving direction to give the maximum signal intensity and in the opposite direction which is 180 degrees opposite to the one receiving direction. Besides, for the case where the tuner 11 cannot measure a signal intensity of the TV broadcast signal due to e.g. the above described radio wave interference, the main controller 16 can allow the tuner 11 to make the measurement again after a predetermined time.

If the multi-directional antenna (smart antenna) 2A is detected, i.e. determined to be connected to the tuner 11 in the above described manner, the user can immediately select a desired channel, thereby enabling channel selection in a short time. In contrast, if the user starts the omni-directional scan (search) operation of the multi-directional antenna (smart antenna) 2A, incorrectly assuming that the multi-directional antenna 2A is connected to the tuner 11 without being aware that the multi-directional antenna 2A is not actually connected to the tuner 11, then it may occur that the user is kept waiting in a state where the selected channel is not received, thereby causing a significant waste of time.

It is to be noted that the number of times or frequency of measurements of measuring the signal intensities can be not only the above described one (once), two or three, but can be four or more as well, in order to more securely and reliably detect the multi-directional antenna 2, i.e. determine whether or not the multi-directional antenna 2 is connected to the tuner 11.

The following describes another process of securely detecting, or determining disconnection or connection of, the multi-directional antenna 2A, using multiple channels in place of the process using one channel as described above. The TV broadcast signal receiver 1 changes the number of channels to be subjected to the signal intensity measurement from one channel P to two channels, i.e. channel Q and channel R (hereafter referred to as "CH-Q", and "CH-R", respectively) (S8). The TV broadcast signal receiver 1 makes the measurements of the signal intensities of the TV broadcast signal for all the receiving directions for each of channels Q and R, and stores all the measured data of signal intensities in the memory 17 in a manner similar to that described above for CH-P. The main controller 16 then reads the measured data stored in the memory 17, and compares all the signal intensities (S17) in a manner also similar to that described above for CH-P, and thereby detects maximum receiving directions $A_q$ and $A_r$ to give maximum signal intensities $E(A_q)$ and $E(A_r)$ for CH-Q and CH-R as well as receiving directions $B_q$ and $B_r$ being 180 degrees opposite to the receiving directions $A_q$ and $A_r$ and giving signal intensities $E(B_q)$ and $E(B_r)$, respectively (S18 and S19). The main controller 16 further stores these data $A_q$, $A_r$, $E(A_q)$, $E(A_r)$, $B_q$, $B_r$, $E(B_q)$ and $E(B_r)$ in the memory 17.

Next, the main controller 16 compares the signal intensities $E(A_q)$ and $E(A_r)$ with $E(B_q)$ and $E(B_r)$ (S20). If two relations $E(A_q) \approx E(B_q)$ and $E(A_r) \approx E(B_r)$ are satisfied at the same time, the main controller 16 determines that the multi-directional antenna (smart antenna) 2A is disconnected from the tuner 11 (S21), and displays a message of this disconnection on the monitor 3 (S22) by displaying "SMART ANTENNA DISAPPEARED" as shown in FIG. 7B. This indicates that the antenna connected to the tuner 11 is the stationary unidirectional antenna 2B, which does not respond to any receiving direction control signal output from the main controller 16, and which does not change in the receiving direction, thereby always satisfying the relation $E(A) \approx E(B)$, meaning that the two signal intensities are substantially the same as each other.

On the other hand, if the measured signal intensities do not satisfy the above two relations at the same time, meaning that the two signal intensities are significantly different from each other, the main controller 16 determines that the multi-directional antenna (smart antenna) 2A is connected to the tuner 11 (S16). A message of this connection is displayed on the monitor 3 (S22) by displaying "SMART ANTENNA DETECTED" as shown in FIG. 7A.

It should be noted here that even a stationary unidirectional antenna in general may make a difference in the pair of measured signal intensities of one channel between in one receiving direction and in the opposite direction 180 degrees opposite to the one receiving direction due to e.g. temporary radio wave interference such that a received radio wave is temporarily obstructed by a moving human body or other moving objects, thereby failing to satisfy the relation $E(A) \approx E(B)$. Thus, assuming such case, it may be unable to recognize the disconnection of the multi-directional antenna 2A or the connection of the stationary unidirectional antenna 2B to the tuner 11. Even in such case, however, by comparing each pair of measured signal intensities, between in one receiving direction and in the opposite direction 180 degrees opposite to the one receiving direction, in each of the two channels, it is possible for the main controller 16 to securely determine that the multi-directional antenna 2A is disconnected from the tuner 11, and hence the stationary unidirectional antenna 2B is connected to the tuner 11, if the two relations $E(A_q) \approx E(B_q)$ and $E(A_r) \approx E(B_r)$ are satisfied at the same time as described above. Besides, for the case where the tuner 11 cannot measure a signal intensity of the TV broadcast signal due to e.g. the above described radio wave interference, the main controller 16 can allow the tuner 11 to make the measurement again after a predetermined time.

By determining that the multi-directional antenna (smart antenna) 2A is not connected, and hence the stationary unidirectional antenna 2B is connected, to the tuner 11 in the above described manner, the user can get aware in a short time that the multi-directional antenna 2A is disconnected from the tuner 11. Thus, it is possible to prevent unnecessary operation such as the omni-directional scan for all the sixteen receiving directions in the digital TV broadcast signal receiver 1, thereby preventing a waste of time and energy for determining a best receiving direction.

It is to be noted that the number of channels to be subjected to the signal intensity measurement can be not only the above described two, but can be three or more as well, in order to more securely determine whether or not the multi-directional antenna 2 is connected to the tuner 11.

Figure 5:
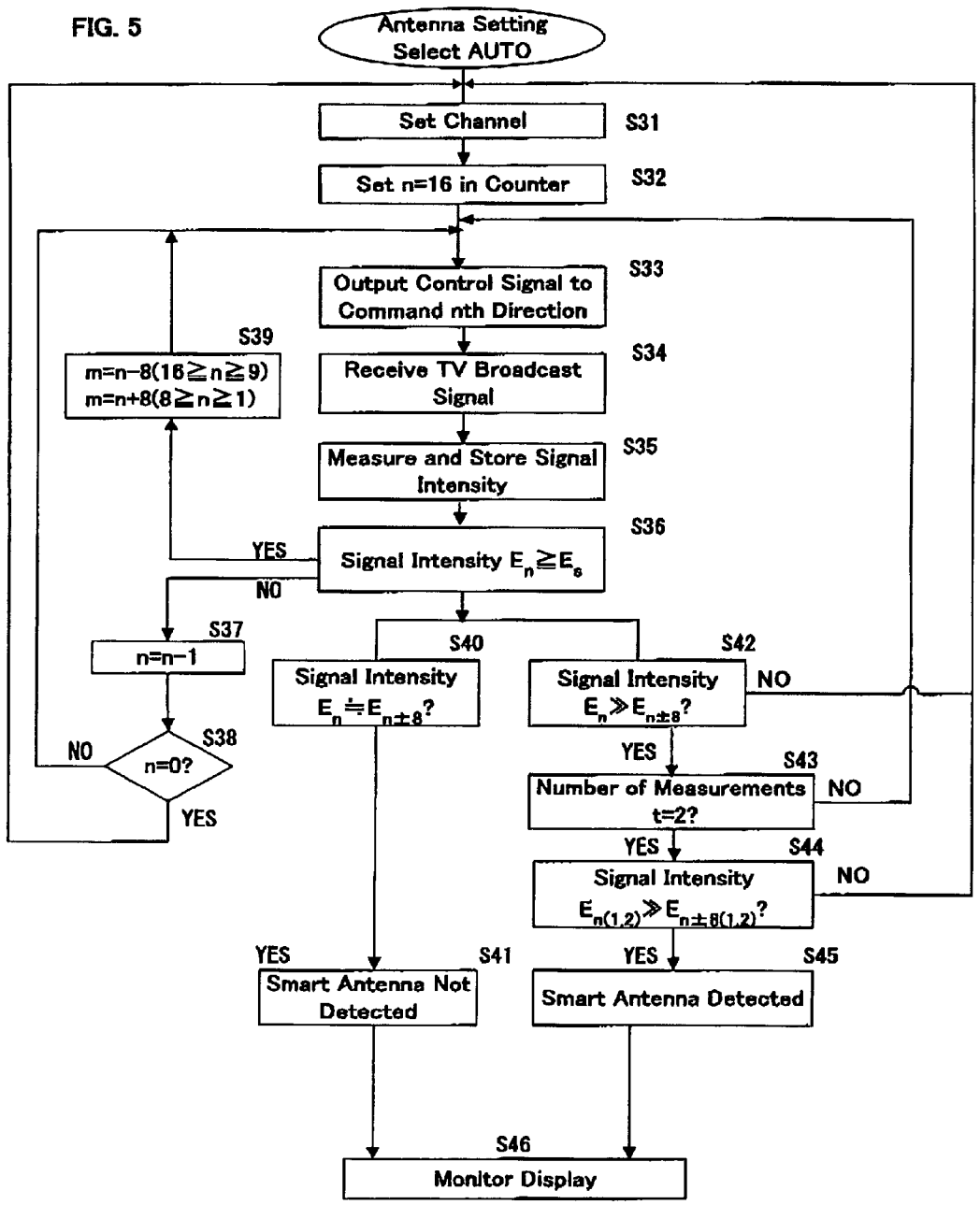
FIG. 5 is a flow chart showing a process performed by the digital TV broadcast signal receiver according to a second embodiment of the present invention.

Hereinafter, referring to the flow chart of FIG. 5, another process performed by the digital TV broadcast signal receiver 1 according to a second embodiment of the present invention will be described, which more specifically includes a receiving direction control of the multi-directional antenna 2A and a detection control of detecting whether the multi-directional antenna 2A is connected to the digital TV broadcast signal receiver 1.

When an automatic switch (AUTO) for setting antenna connection is selected on an antenna connection setting screen (refer to FIG. 6), and when a certain channel (designated by channel T here) is set (S31), the main controller 16 sets n=16 in a counter (S32), and outputs a control signal to command an nth receiving direction (S33). After a certain time required for the main controller 16 to output the control signal to the antenna controller 21 of the multi-directional antenna 2A and to switch the receiving direction of the multi-directional antenna 2A, the tuner 11 receives a TV broadcast signal of channel T (S34). The tuner 11 measures the signal intensity of the received TV broadcast signal, and the main controller 16 stores data of the measured signal intensity in the memory 17 (S35).

In a receiving direction "n" (nth receiving direction in the sixteen directions) which, for the first time in the signal intensity measurement, gives a signal level equal to a predetermined level or higher (such signal level being hereafter designated by Es) to enable image display of a predetermined quality or higher (YES in S36), the tuner 11 measures a signal intensity $E_n$ of a TV broadcast signal. Selecting a receiving direction "m" 180 degrees opposite to the receiving direction "n" (m=n−8 when 16≧n≧9, and m=n+8 when 8≧n≧1) (S39), the tuner 11 further measures a signal intensity $E_m$ which is equivalent to $E_{n\pm 8}$, and compares these signal intensities $E_n$ and $E_{n\pm 8}$. If $E_n \approx E_{n\pm 8}$ (YES in S40), meaning that the two signal intensities are substantially the same as each other, the main controller 16 determines that the multi-directional antenna (smart antenna) 2A is not connected to or disconnected from the tuner 11 (S41), and displays its message on the monitor 3 (S46) by displaying "SMART ANTENNA DISAPPEARED" as shown in FIG. 7B.

On the other hand, if NO in the step S40 and $En >> E_{n\pm 8}$ (YES in S42), meaning that they are significantly different from each other, the main controller 16 can determine that the multidirectional antenna (smart antenna) 2A is connected to the tuner 11. However, for more securely make the determination, the tuner alternately measures signal intensities in the two opposite directions again (S43), and compares the data of the two measured signal intensities ($E_{n(1,2)}$ and $E_{n\pm 8(1,2)}$) (S44). If the comparison indicates the same relative relation ($E_{n(1,2)} >> E_{n\pm 8(1,2)}$) (YES in S44), the main controller 16 determines that the multi-directional antenna (smart antenna) 2A is connected to the tuner 11 (S45), and displays its message on the monitor 3 (S46) by displaying "SMART ANTENNA DETECTED" as shown in FIG. 7A.

Back to the step S36, if NO in the step S36, the main controller 16 changes the receiving direction to a subsequent receiving direction (S37), goes back to the step S33, and repeats the steps from S33 to S36 until the signal intensity Es is obtained in some receiving direction by the measurement. If the signal intensity Es is not obtained after signal intensities in all the receiving directions are measured (YES in S38), or if NO in the step S42 or S44, the main controller 16 changes the channel to a further channel (S31), and subjects the further channel to a process similar to that described above until the signal intensity Es in some receiving direction is obtained.

As described above, according to the second embodiment of the present invention, the main controller 16 can determine the connection or disconnection of the multi-directional antenna 2A to or from the tuner 11 in a receiving direction which, for the first time in the signal intensity measurement, gives the signal level Es that is equal to a predetermined level or higher to enable image display of a predetermine quality or higher. Accordingly, it is possible to determine the connection or disconnection of the multi-directional antenna 2A in a short time for the purpose of channel selection. More specifically, the second embodiment gives a high probability of being able to determine the connection or disconnection of the multi-directional antenna 2A before completion of one omni-directional scan or one time scanning search for the sixteen receiving directions. In particular, the second embodiment makes it possible to determine the disconnection of the multidirectional antenna 2A from the tuner 11 in a short time, so that it is possible to prevent unnecessary operation such as the omni-directional scan for all the sixteen receiving directions in the case where the stationary unidirectional antenna 2B is connected to the tuner 11, thereby preventing a waste of time and energy for determining a best receiving direction.

As described in the foregoing, according to the digital TV broadcast signal receiver of the present invention, a signal intensity of a TV broadcast signal in at least one receiving direction for at least one channel and a signal intensity in the opposite direction 180 degrees opposite to the at least one receiving direction are measured and compared. Thereby, it is possible to quickly and securely determine, and notify a user in advance by displaying on a display whether it is connected to a multi-directional antenna or connected to a stationary unidirectional antenna, thereby making it possible to determine a best receiving direction of the multi-directional antenna quickly and without fail after confirming the connection of the antenna, and to reduce unnecessary time and number of scans required for selecting a desired channel to receive without forcing the user of unnecessary channel selection operation.

It is to be noted that the present invention is not limited to the above embodiments, and various modifications are possible. For example, the first embodiment of the present invention can be modified using the concept of the second embodiment. More specifically, in the first embodiment, instead of measuring the signal intensities for all the receiving directions, it is possible to measure a signal intensity of the TV broadcast signal in a receiving direction to give a signal level Es equal to or higher than a predetermined level to enable image display of a predetermined quality or higher, and further to measure a signal intensity in the 180 degrees opposite direction for comparison. This makes it possible to determine the connection or disconnection of the multi-directional antenna to or from the tuner by the first measurement of the signal intensity in one receiving direction to give Es together with the signal intensity in the 180 degrees opposite direction, or by multiple measurements of the signal intensities in multiple receiving directions to give Es each together with the signal intensity in the 180 degrees opposite direction, thereby reducing time for the determination.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A digital television broadcast signal receiver to which a multi-directional antenna is to be connected for receiving a television broadcast signal by making one of the multiple receiving directions active, the digital television broadcast signal receiver comprising:
    a control signal output unit for outputting, to the multi-directional antenna, a control signal to command a receiving direction for receiving the television broadcast signal;
    a tuner which is to be connected to the multi-directional antenna for receiving the television broadcast signal and measuring signal intensity of the received television broadcast signal;
    a broadcast signal processing unit for subjecting the television broadcast signal received by the tuner to a predetermined signal processing;
    an image signal output unit for outputting, to a monitor, the television broadcast signal having been subjected to the predetermined signal processing by the broadcast signal processing unit;
    a memory for temporarily storing the television broadcast signal having been subjected to the predetermined signal processing by the broadcast signal processing unit;
    a receiving direction determining unit for determining a best receiving direction for each receivable channel using the television broadcast signal stored in the memory;
    a main controller for controlling respective elements in the digital television broadcast signal receiver; and
    an antenna connection selecting switch for selecting connection of antenna and for starting an operation of the control signal output unit,
    wherein when the antenna connection selecting switch is set in an automatic mode, the control signal output unit sequentially outputs, to the multi-directional antenna at given time intervals, a control signal to sequentially command receiving directions of the multi-directional antenna,
    wherein the tuner sequentially measures signal intensities of the television broadcast signal in the multiple receiving directions for at least one channel, the measured signal intensities being stored in the memory,
    wherein based on the measured and stored signal intensities, the main controller detects a maximum receiving direction to give a maximum signal intensity among the receiving directions of the multi-directional antenna,
    wherein the tuner further measures signal intensity of the television broadcast signal in an opposite receiving direction 180 degrees opposite to the maximum receiving direction to give the maximum signal intensity, the measured signal intensity in the opposite receiving direction being stored in the memory,
    wherein if the signal intensity in the maximum receiving direction is significantly different from the signal intensity in the opposite receiving direction for the at least one channel, the main controller determines that the multi-directional antenna is connected to the tuner, and
    wherein if the signal intensity in the maximum receiving direction is substantially the same as the signal intensity in the opposite receiving direction for the at least one channel, the main controller determines that the multi-directional antenna is disconnected from the tuner.

2. The digital television broadcast signal receiver according to claim 1,
    wherein the tuner measures, at least two times, the signal intensities of the television broadcast signal in the maximum receiving direction and in the opposite receiving direction for the at least one channel, the measured signal intensities being stored in the memory,
    wherein if the signal intensity in the maximum receiving direction and the signal intensity in the opposite receiving direction in one of the at least two time measurements are substantially the same as those, respectively, in a further one of the at least two time measurements, and if, in at least one of the at least two time measurements, the signal intensity in the maximum receiving direction is significantly different from the signal intensity in the opposite receiving direction, then the main controller determines that the multi-directional antenna is connected to the tuner, and displays a message of the connection on the monitor, and
    wherein if, in at least one of the at least two time measurements, the signal intensity in the maximum receiving direction is substantially the same as the signal intensity in the opposite receiving direction, the main controller determines that the multi-directional antenna is disconnected from the tuner, and displays a message of the disconnection on the monitor.

3. The digital television broadcast signal receiver according to claim 1,
    wherein the tuner measures the signal intensities of the television broadcast signal in the maximum receiving direction and in the opposite receiving direction for each of at least two channels, the measured signal intensities being stored in the memory, and wherein if the signal intensity in the maximum receiving direction is substantially the same as the signal intensity in the opposite receiving direction for each of the at least two channels, the main controller determines that the multi-directional antenna is disconnected from the tuner, and displays a message of the disconnection on the monitor.

4. A digital television broadcast signal receiver to which a multi-directional antenna is to be connected for receiving a television broadcast signal by making one of the multiple receiving directions active, the digital television broadcast signal receiver comprising:
 a control signal output unit for outputting, to the multi-directional antenna, a control signal to command a receiving direction for receiving the television broadcast signal;
 a tuner which is to be connected to the multi-directional antenna for receiving the television broadcast signal and measuring signal intensity of the received television broadcast signal;
 a broadcast signal processing unit for subjecting the television broadcast signal received by the tuner to a predetermined signal processing;
 an image signal output unit for outputting, to a monitor, the television broadcast signal having been subjected to the predetermined signal processing by the broadcast signal processing unit;
 a memory for temporarily storing the television broadcast signal having been subjected to the predetermined signal processing by the broadcast signal processing unit;
 a main controller for controlling respective elements in the digital television broadcast signal receiver; and
 an antenna connection selecting switch for selecting connection of antenna and for starting an operation of the control signal output unit,
 wherein when the antenna connection selecting switch is set in an automatic mode, the control signal output unit outputs, to the multi-directional antenna, a control signal to command a receiving direction of the multi-directional antenna,
 wherein in at least one receiving direction for at least one channel, the tuner measures at least one signal intensity of the television broadcast signal to give a predetermined level or higher to enable image display of a predetermined quality or higher, the measured at least one signal intensity being stored in the memory,
 wherein the tuner further measures at least one further signal intensity of the television broadcast signal which is a signal intensity in an opposite receiving direction 180 degrees opposite to the at least one receiving direction to give the predetermined level or higher, the measured at least one further signal intensity being stored in the memory,
 wherein if the at least one signal intensity in the at least one receiving direction is significantly different from the at least one further signal intensity in the opposite receiving direction, the main controller determines that the multi-directional antenna is connected to the tuner, and displays a message of the connection on the monitor, and
 wherein if the at least one signal intensity in the at least one receiving direction is substantially the same as the at least one further signal intensity in the opposite receiving direction, the main controller determines that the multi-directional antenna is disconnected from the tuner, and displays a message of the disconnection on the monitor.

5. The digital television broadcast receiver according to claim 4,
 wherein when the antenna connection selecting switch is set in an automatic mode, the control signal output unit sequentially outputs, to the multi-directional antenna at given time intervals, a control signal to sequentially command receiving directions of the multi-directional antenna,
 wherein the tuner sequentially measures signal intensities of the television broadcast signal in the receiving directions for at least one channel, the measured signal intensities being stored in the memory,
 wherein the at least one signal intensity to give the predetermined level or higher is a signal intensity measured in one of the receiving directions which, for the first time in the signal intensity measurement, gives the signal level equal to the predetermined level or higher to enable the image display of the predetermined quality or higher,
 wherein the tuner measures, at least two times, the signal intensity in the at least one receiving direction and the signal intensity in the opposite direction, and
 wherein if, in each of the at least two time measurements, the at least one signal intensity in the at least one receiving direction is significantly different from the at least one further signal intensity in the opposite receiving direction, the main controller determines that the multi-directional antenna is connected to the tuner.

* * * * *